United States Patent [19]

Muehlbach et al.

[11] Patent Number: 4,868,235

[45] Date of Patent: Sep. 19, 1989

[54] THERMOPLASTIC MOLDING MATERIALS

[75] Inventors: Klaus Muehlbach, Heppenheim; Michael Portugall, Wachenheim; Karl Ruppmich; Erhard Seiler, both of Ludwigshafen; Hermann Brandt, Schifferstadt, all of Fed. Rep. of Germany

[73] Assignee: BASF Aktiengesellschaft, Ludwigshafen, Fed. Rep. of Germany

[21] Appl. No.: 260,591

[22] Filed: Oct. 21, 1988

[30] Foreign Application Priority Data

Oct. 22, 1987 [DE] Fed. Rep. of Germany ....... 3735754

[51] Int. Cl.$^4$ ............................................. C08L 69/00
[52] U.S. Cl. .................................... 524/252; 524/504; 525/67
[58] Field of Search .......................... 525/67, 148, 468; 524/252, 504

[56] References Cited

U.S. PATENT DOCUMENTS 4,430,478 2/1984 Schmitt et al. ...................... 525/71
4,526,926 7/1985 Weber et al. ......................... 525/67
4,560,725 12/1985 Van Bokhoven et al. ........... 525/67

FOREIGN PATENT DOCUMENTS 1146295 5/1983 Canada .
0190884 8/1986 European Pat. Off. .
3521407 1/1987 Fed. Rep. of Germany .

Primary Examiner—Theodore E. Pertilla
Attorney, Agent, or Firm—Oblon, Spivak, McClelland, Maier & Neustadt

[57] ABSTRACT

A thermoplastic material containing, based in each case on the molding material comprising A and B, A from 30 to 80% be weight of one or more polycarbonates and B from 70 to 20% by weight of a blend of two different components $B_1$ and $B_2$, each of which consists of one or more graft copolymers $b_{11}$ and $b_{21}$ and each of which consists of one or more copolymers (hard matrix) $b_{12}$ and $b_{22}$, respectively, the graft copolymer $b_{11}$ being prepared in emulsion and the graft copolymer $b_{21}$ being prepared by another method.

9 Claims, No Drawings

THERMOPLASTIC MOLDING MATERIALS

The present invention relates to a thermoplastic material containing, based in each case on the molding material comprising A and B, A from 30 to 80% by weight of one or more polycarbonates and B from 70 to 20% by weight of a blend of two different components $B_1$ and $B_2$, each of which consists of one or more graft copolymers $b_{11}$ and $b_{21}$ and each of which consists of one or more copolymers (hard matrix) $b_{12}$ and $b_{22}$, respectively, the graft copolymer $b_{11}$ being prepared in emulsion and the graft copolymer $b_{21}$ being prepared by another method.

The relevant prior art includes (1) German Laid-Open Application DOS No. 3,521,407

(2) Canadian Pat. No. 1,146,295

(3) U.S. Pat. No. 4,526,926

(4) U.S. Pat. No. 4,560,725

(5) European Pat. No. 190,884 and (6) U.S. Pat. No. 4,430,478.

(1) describes blends of PC and 2 graft copolymers as well as copolymers forming the hard matrix, where the graft copolymers can be produced by mass or emulsion polymerization and have median particle diameters of from 0.09 to 5 μm but different degrees of grafting.

(2) discloses molding materials of PC and 2 graft copolymers having particle sizes of from 0.1 to 2 μm, the latter having degrees of grafting of from 0.2 to 0.5 and from 0.7 to 0.9 and being predominantly prepared by emulsion polymerization.

(3) describes PC/ABS molding materials whose soft phase has particles of >0.5 μm. The graft copolymer can be prepared by mass or emulsion polymerization with agglomeration; it is also possible to use mixtures of ABS prepared by emulsion and mass polymerization.

Finally, (4) describes PC/ABS molding materials whose soft phase is said to have a median particle diameter of from 0.09 to 0.7 μm. The graft copolymer (the soft phase) can be produced by emulsion or mass polymerization.

(5) and (6) each describe polycarbonate-free ABS molding materials which contain a solution ABS polymer component on the one hand and an emulsion polymer component on the other, and (5) also mentions blending with PC.

PC/ABS blends have long been known (cf. German Pat. Nos. 1,170,141 and 1,810,993). ABS/PC blends generally have good mechanical properties, in particular good uniaxial and multiaxial toughnesses down to low temperatures and high Vicat temperatures. The main fields of use are the automotive sector and the electrical and household appliance industries. The requirements which the materials have to meet include great toughness, even at low temperatures, good processibility, in particular in the case of workpieces of complicated shape, and excellent surface properties.

The known blends of ABS and PC meet only some of the requirements, depending on the structure and composition of the said blends.

For example, blends of PC and solution ABS polymers have good flow properties and toughness but only a low notched impact strength at −40° C. and poor gloss.

Blends of PC and emulsion ABS polymers have good toughness and good gloss but poor flow properties.

It is an object of the present invention to provide blends of graft copolymers, in particular those based on ABS and PC, which have good toughness as well as good flow properties and high gloss coupled with good weather resistance.

We have found that this object is achieved by a molding material as claimed in claim 1.

The present invention therefore relates to a thermoplastic molding material containing, based in each case on the molding material consisting of A+B, A from 30 to 80% by weight of one or more polycarbonates and B from 70 to 20% by weight of a mixture of two different components $B_1$ and $B_2$, each of which consists of one or more graft copolymers $b_{11}$ and $b_{21}$ and each of which consists of one or more copolymers (hard matrix) $b_{12}$ and $b_{22}$, the graft copolymer $b_{11}$ being prepared by emulsion polymerization and the graft copolymer $b_{21}$ being prepared by another method.

In the molding material, B contains from 20 to 80% by weight, based on B, of component $B_1$, and component $B_1$ contains from 20 to 60% by weight, based on $B_1$, of graft copolymer $b_{11}$ and from 80 to 40% by weight, based on $B_1$, of copolymer $b_{12}$, the graft copolymer $b_{11}$ being prepared by emulsion polymerization of from 20 to 60 parts by weight of a mixture of one or more vinyl aromatic monomers of 8 to 12 carbon atoms or methyl methacrylate and of (meth)acrylonitrile in a weight ratio of from 50:50 to 95:5 onto from 80 to 40 parts by weight of a latex of an elastomer (rubber) obtained by emulsion polymerization and having a median particle diameter of from 0.05 to 0.5 μm ($d_{50}$ value of the mass distribution), and copolymer $b_{12}$ containing from 50 to 95% by weight, based on $b_{12}$, of one or more vinylaromatic monomers of 8 to 12 carbon atoms or methyl methacrylate or a mixture thereof and from 50 to 5% by weight of (meth)acrylonitrile or methyl methacrylate as copolymerized units, and furthermore B contains from 80 to 20% by weight, based on B, of component $B_2$ and component $B_2$ contains from 5 to 35% by weight, based on $B_2$, of graft copolymer $b_{21}$ and from 95 to 65% by weight, based on $B_2$, of copolymer $b_{22}$, the graft copolymer $b_{21}$ and the copolymer $b_{22}$ being prepared simultaneously by polymerization of 100 parts by weight of a mixture of one or more vinylaromatic monomers of 8 to 12 carbon atoms or methyl methacrylate or a mixture thereof and (meth)acrylonitrile or methyl methacrylate in a weight ratio of from 50:50 to 95:5 in the presence of from 3 to 33 parts by weight of an elastomer by mass polymerization, in the presence or absence of a solvent, or by mass-suspension polymerization so that the median particle diameter of the particles resulting from the grafting process is from 0.8 to 5 μm, and copolymer $b_{22}$ containing from 50 to 95% by weight, based on $b_{22}$, of one or more vinylaromatic monomers of 8 to 12 carbon atoms or methyl methacrylate or a mixture thereof and from 50 to 5% by weight of (meth)acrylonitrile or methyl methacrylate as copolymerized units, with the proviso that the total elastomer content of $B_1$ and $B_2$ is from 10 to 25% by weight, based on B, and the weight ratio of the elastomer content of $B_1$ and $B_2$ is from 95:5 to 55:45.

The molding material thus contains 2 graft copolymers from different sources (at least a bimodal soft phase) and having small (emulsion polymer) particles and large (solution polymer) particles, and the graft copolymer produced in the emulsion process must account for more than 55% by weight of the grafting base (the total elastomer content).

Surprisingly, in spite of a significant reduction in the amount of rubber (in comparison with blends of PC and exclusively emulsion ABS polymer), the novel molding materials have excellent toughness.

The composition of the molding material in terms of the components, their preparation and the preparation of the molding material are described below.

The molding material contains components A and B and in particular consists of these components.

The novel molding material contains from 30 to 80, preferably from 40 to 70, % by weight of A and from 70 to 20, preferably from 30 to 60, % by weight of B, the percentages in each case being based on A+B.

100 parts by weight of the molding material comprising A+B may furthermore contain from 0.1 to 40, preferably from 0.1 to 35, parts by weight of conventional additives C.

Component A

Thermoplastic, aromatic polycarbonates of component A which are suitable according to the invention are those based on diphenols of the formula (I)

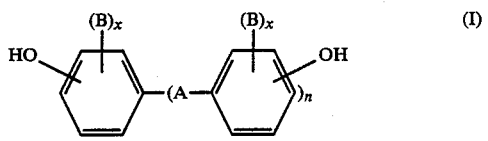

where A is a single bond, $C_1$–$C_5$-alkylene, $C_2$–$C_5$-alkylidene, $C_5$- or $C_6$-cycloalkylidene, —S— or —$SO_2$—, B is chlorine, bromine or methyl, x is 0, 1 or 2 and n s 1 or 0.

Polycarbonates of component A which are suitable according to the invention are both homopolycarbonates and copolycarbonates.

The diphenols of the formula (I) are either known from the literature or can be prepared by methods known from the literature.

The preparation of the polycarbonates of component A which are suitable according to the invention is known from the literature and can be carried out, for example, by the phase boundary method using phosgene or by the method in a homogeneous phase (i.e. the pyridine method) using phosgene, the desired molecular weight being obtained in a known manner by means of an appropriate amount of known chain terminators. (Regarding polydiorganosiloxane-containing polycarbonates, see, for example, German Laid-Open Application DOS 3,334,782).

Examples of suitable chain terminators are phenol, p-chlorophenol, p-tert-butylphenol and 2,4,6-tribromophenol, as well as long-chain alkylphenols, such as 4-(1,3-tetramethylbutyl)-phenol, according to German Laid-Open Application DOS No. 2,842,005, or monoalkylphenols or dialkylphenols where the alkyl substituents have a total of 8 to 20 carbon atoms, according to German Patent Application P No. 35 06 472.2 (Le A 23 654), eg. p-nonylphenol, 3,5-di-tert-butylphenol, p-tert-octylphenol, p-dodecylphenol, 2-(3,5-dimethylheptyl)-phenol and 4-(3,5-dimethylheptyl)-phenol.

The polycarbonates of component A which are suitable according to the invention have mean weight average molecular weights (Mw, measured, for example, by ultra-centrifuging or scattered light measurement) of from 10,000 to 200,000, preferably from 20,000 to 80,000.

Examples of suitable diphenols of the formula (I) are hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, 2,2-bis-(3,5-dibromo-4-hydroxyphenyl)-propane and 2,2-bis-(3,5-dimethyl-4-hydroxyphenyl)-propane.

Preferred diphenols of the formula (I) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane and 1,1-bis-(4-hydroxyphenyl)-cyclohexane.

The said polycarbonates of component A may be branched in a known manner, preferably by incorporation of from 0.05 to 2.0 mol %, based on the sum of the diphenols used, of trifunctional compounds or compounds which have a higher functionality than three, for example those containing three or more than three phenolic OH groups.

Preferred polycarbonates, in addition to bisphenol A homopolycarbonate, are the copolycarbonates of bisphenol A with up to 15 mol %, based on the total number of moles of diphenols, of 2,2-bis-(3,5-dibromo-4-hydroxyphenyl)-propane.

Component B

Component B is composed of a mixture of components $B_1$ and $B_2$ ($B_1+B_2=100\%$). Component B contains from 20 to 80, preferably from 40 to 80, in particular from 50 to 75, % by weight of $B_1$ and from 80 to 20, preferably from 60 to 20, in particular from 50 to 25, % by weight of $B_2$, the percentages in each case being based on B.

Components $B_1$ and $B_2$ each contain one or more graft copolymers (soft phase) and one or more copolymers (hard phase).

Component $B_1$ contains from 20 to 60, preferably from 25 to 55, in particular from 25 to 50, % by weight of graft copolymer $b_{11}$ and from 80 to 40, preferably from 75 to 45, in particular from 75 to 50, % by weight of copolymer $b_{12}$, the percentages in each case being based on $B_1$.

Component $B_2$ contains from 5 to 35, in particular from 10 to 30, preferably from 15 to 25, % by weight of graft copolymer $b_{21}$ and from 95 to 65, in particular from 90 to 70, preferably from 85 to 75, % by weight of copolymer $b_{22}$, the percentages in each case being based on $B_2$.

The sum of the elastomer contents of the grafting base of the graft copolymers $b_{11}$ and $b_{21}$ should be from 10 to 25, in particular from 15 to 21, % by weight, based on B, the weight ratio of the elastomer contents of $B_1$ and $B_2$ being from 95:5 to 55:45, preferably from 85:15 to 60:40. In particular, the total elastomer content of $B_1$ and $B_2$ should be less than 9.5% by weight, based on the sum of the components A and B, and the weight ratio of the graft rubbers $b_{11}$ and $b_{21}$ should be greater than 1.5.

Preparation of $B_1$ $B_1$ is the mixture of one or more finely divided graft copolymers $b_{11}$, produced by emulsion polymerization, with the hard phase $b_{12}$.

$b_{11}$:

The graft copolymer $b_{11}$ used is an emulsion graft copolymer which has a hard phase as the graft and an elastomer phase as the grafting base. The hard phase of the emulsion graft copolymer essentially contains one or more vinylaromatic monomers of 8 to 12 carbon atoms and/or methyl methacrylate and one or more ethylenically unsaturated monomers. Particularly suitable ethylenically unsaturated monomers are (meth)acrylonitrile and methyl methacrylate and mixtures of these monomers. Acrylonitrile is preferred. A preferably used vinylaromatic monomer is styrene. However, it is also possible to use styrene mixed with α-methylstyrene or p-methylstyrene if products having greater heat distortion resistance are desired, although the use of such mixtures is not preferred. For the preparation of molding materials having high heat distortion resistance, (meth)acrylonitrile or methyl methacrylate can be completely or partially replaced by maleic anhydride or N-substituted maleimides.

The elastomer phase is a homopolymer or copolymer which is essentially composed of an aliphatic diene of 4 or 5 carbon atoms or, in addition to this contains one or more alkyl acrylates, where alkyl is of 2 to 8 carbon atoms, or styrene or acrylonitrile in amounts of up to 30% by weight, or predominantly or exclusively consists of one or more alkyl acrylates where alkyl is of 2 to 8 carbon atoms. The predominantly acrylate-containing rubbers may contain, as copolymerized units, up to 30% by weight, based on the rubber content, of monomers such as vinyl acetate, acrylonitrile, styrene, methyl methacrylate and/or vinyl ethers.

The acrylate rubbers may furthermore contain fairly small amounts, preferably up to 5% by weight, based on the weight of the rubber, of crosslinking, ethylenically unsaturated monomers. Such crosslinking agents are, for example, alkylenediol di(meth)acrylates, polyester di(meth)acrylate, divinylbenzene, trivinylbenzene, triallyl cyanurate, tricyclodecenyl acrylate, allyl (meth)acrylate, butadiene or isoprene. Such scrylate rubbers are known. Acrylate rubbers as a grafting base may furthermore be products which are built up in two stages and which contain a crosslinked diene rubber of one or more conjugated dienes, such as polybutadiene or a copolymer of a conjugated diene with an ethylenically unsaturated monomer, such as styrene and/or acrylonitrile, as the core. Examples of other suitable rubbers are EPDM rubbers, i.e. rubbers consisting of ethylene, propylene and a nonconjugated diene monomer.

The use of only aliphatic dienes as monomers in the grafting base essentially has an advantageous effect on the low-temperature toughness and on the surface gloss of the molding materials.

The predominant or exclusive use of an alkyl acrylate in the grafting base results in good aging resistance and weathering resistance as well as good resistance to discoloration and good heat stability during processing of the molding material by a thermoplastic method.

The graft copolymer $b_{11}$ is prepared in a conventional manner by graft copolymerization of from 20 to 60, preferably from 25 to 50, in particular from 30 to 45, very particularly from 30 to 39, % by weight of a monomer mixture of one or more vinylaromatic monomers of 8 to 12 carbon atoms, methyl methacrylate or a mixture thereof and an ethylenically unsaturated monomer in an aqueous emulsion of from 80 to 40, preferably from 75 to 50, in particular from 70 to 55, very particularly from 70 to 61, % by weight of a rubber-like polymer. A preferably used vinylaromatic monomer is styrene, a mixture of styrene with α-methylstyrene being less preferable. Particularly ethylenically unsaturated monomers are (meth)acrylonitrile and methyl methacrylate. For the preparation of molding materials having high heat distortion resistance (meth)acrylonitrile or methyl methacrylate may be completely or partially replaced by maleic anhydride or N-substituted maleimides. A particularly preferred rubber-like polymer forming the grafting base is polybutadiene, in the form of an emulsion polymer having a cis content of from 20 to 30% and a 1,2-vinyl content of from 18 to 25% and a roughly 55% 1,4-trans configuration. Instead of the diene, however, it is also possible to use an alkyl acrylate where alkyl is of 2 to 8 carbon atoms. Butyl acrylate and 2-ethylhexyl acrylate are also preferred. However, copolymers of acrylates with up to 60% by weight of butadiene can also be employed. The weight ratio of the graft-forming monomers styrene to acrylonitrile can be from 45:55 (where methyl methacrylate is used) or from 50:50 (where acrylonitrile is used) to 95:5; the ratio is preferably from 60:40 to 90:10, in particular from 65:35 to 80:20. The graft polymerization is carried out by a procedure in which a monomer mixture of the graft-forming monomers in the above mentioned weight ratio is added to an aqueous emulsion of polybutadiene or acrylate polymer or of the copolymer of these components. During grafting, emulsifiers may also be added. The polymerization is initiated by means of free radical initiators, such as azo compounds or peroxides. The polymerization temperature may be from 30° to 100° C. Conventional assistants, such as regulators and stabilizers, may be used for carrying out the polymerization.

The elastomer particles which serve as the grafting base for the graft copolymer $b_{11}$ have a median particle size of from 0.05 to 0.5 μm, preferably from 0.1 to 0.45 μm ($d_{50}$ value of the integer a mass distribution). The distribution can be monomodal or bimodal, i.e. possess 2 fractions of particles in the range from 0.05 to 0.18 μm and from 0.25 to 0.5 μm, as described in (6).

It is also possible, using the seed latex procedure, to produce the bimodal distribution of the particles of the elastomer phase of the grafting base of the graft copolymer $b_{11}$. However, such a preparation is more time-consuming, since in addition a seed latex and thereafter larger particles have to be prepared and the polymerization of butadiene on a seed latex for the preparation of larger particles requires very long reaction times. Synthesis of $b_{11}$ need not be restricted to a simple core/shell structure. Instead, a multistage synthesis may also be advantageous (two-stage, three-stage and multistage grafting). For example, part of the vinylaromatic monomers may be grafted on initially, followed, in a further step, by a mixture of vinylaromatic monomers and ethylenically unsaturated monomers. $b_{12}$:

The copolymer $b_{12}$ is synthesized from monomers which form a hard phase. It can be prepared in a conventional manner by polymerization of a vinylaromatic monomer of 8 to 12 carbon atoms, methyl methacrylate or a mixture thereof in amounts of from 95 to 50, in particular from 80 to 65, % by weight, mixed with an ethylenically unsaturated vinyl monomer, such as (meth)acrylonitrile, in amounts of from 50 to 5, in particular from 35 to 20, % by weight, or of methyl methacrylate in amounts of from 20 to 55% by weight. Suitable vinylaromatic monomers are styrene and the alkylstyrenes, in particular α-methyl-styrene and p-methylstyrene. α-Methylstyrene is predominantly used when high heat distortion resistance of the molding materials is desired. Usually, mixtures of styrene and acrylonitrile containing up to 30% by weight of α-methylstyrene are used for this purpose. Preferably used copolymers are those which contain from 20 to 35% by weight of acrylonitrile and from 80 to 65% by weight of styrene. To prepare molding materials having high heat distortion resistance, (meth)acrylonitrile or methyl methacrylate can be completely or partially replaced by maleic anhydride or N-substituted maleimides. These copolymers are commercially available and can be prepared, for example, as described in German Published Application DAS No. 1,001,001 or German Pat. No. 1,003,436. The molecular weight range of the copolymer is from 80,000 to 250,000 (weight average $\overline{M}_w$ from light scattering).

The copolymer $b_{12}$ preferably has the same composition as the graft shell of the corresponding graft copolymer $b_{11}$. The preparation of $b_{11}$ generally results in the formation of ungrafted parts of the shell which are soluble and are assigned to component $b_{11}$, as a coherent constituent.

Copolymer $b_{12}$ thus in turn is a mixture and, particularly when commercial products prepared by mass or solution polymerization are used, may also have a different composition and different molecular weight compared with the shell.

Preparation of $B_2$:

$B_2$ is a blend of one or more coarse-particled mass (solution) or mass-suspension graft copolymers $b_{21}$ with the associated hard phase $b_{22}$. $B_2$ is preferably prepared in solution. The preparation is known and is described adequately in, for example, (6).

$b_{21}$ and $b_{22}$ are prepared simultaneously in one step, the grafting yield being adjusted to 5-30% preferably 5-20%. The grafting yield is the weight ratio of the graft monomers actually grafted to the total amount of graft monomers used $\times 100$. For this purpose, 100 parts by weight of a mixture of one or more vinylaromatic monomers of 8 to 12 carbon atoms, methyl methacrylate or a mixture thereof and (meth)acrylonitrile or methyl methacrylate in a weight ratio of from 50:50 to 95:5, preferably from 60:40 to 90:10, in particular from 65:35 to 80:20, are polymerized in a conventional manner in the presence of from 3 to 33, preferably from 4 to 21, in particular from 6 to 14, particularly preferably from 6 to 10, parts by weight of an elastomer by the mass polymerization method, preferably also in the presence of an inert solvent, or by the mass-suspension method, so that thereafter the median particle diameter of the resulting particles from the grafting procedure is from 0.8 to 5 μm, preferably from 1.0 to 2.0 μm. In this process, the graft polymer $b_{21}$ 15 formed after phase inversion by grafting and inclusion of some of the monomers on or in the elastomer. The remaining part of the monomers forms the copolymer $b_{22}$. The weight ratio of elastomer to grafted and included monomer in $b_{21}$ is from 4:6 to 6:4. The grafting yield (the ratio of grafted monomers to total amount of monomers) is from 5 to 30%, preferably from 5 to 20%.

The vinylaromatic monomers are the same as those also used in the preparation of $b_{11}$. Preferably, only styrene together with acrylonitrile is used. Examples of suitable solvents are cyclohexane and alkylaromatics, in particular ethylbenzene.

A preferred elastomer is polybutadiene having a cis content of from 30 to 40% and a 1,2-vinyl content of from 7 to 14%. It is also possible to use copolymers of butadiene with from 15 to 40% by weight of vinylaromatic monomers, in particular styrene. Mixtures of polybutadiene rubbers and styrene/butadiene block rubbers can also be used. A preferred procedure for the preparation of the graft copolymer $b_{21}$ is described in German Laid-Open Application DOS No. 1,495,089.

If the ungrafted parts in the preparation of the graft copolymer $b_{11}$ and $b_{21}$ are not sufficient to give the blends $B_1$ and $B_2$, respectively, which is generally the case, separately prepared copolymers having the compositions stated under $b_{12}$ and $b_{22}$ must be added.

The composition of the graft shells of $b11$ and $b_{21}$ and of the copolymers $b_{12}$ and $b_{22}$ can be identical or different.

Component C

The novel molding material may contain, as component C, additives which are typical and commonly used for polycarbonates, SAN polymers and graft copolymers based on ABS, etc. or blends of these. Examples of such additives are fillers, in particular glass fibers and carbon fibers, and materials for achieving greater shielding from electromagnetic waves (for example metal flakes, powders or fibers and metal-coated fillers), dyes, pigments, antistatic agents, antioxidants, stabilizers and also flameproofing agents and in particular the lubricants required for the further processing of the molding materials, for example in the production of moldings and shaped articles. Examples of lubricants are, in particular, those based on N,N'-bisstearylethylenediamine (Accra wax), which are preferably used to maintain the processing properties of the molding materials at a high level. Surprisingly, these are more suitable than the Pluriole ® silicone oils and the stearates.

Flameproofing agents in the widest sense are halogen-containing, preferably bromine-containing, low molecular weight and high molecular weight (aromatic) compounds, selected from the classes consisting of the aryls, aryl ethers, arylalkyl ethers, arylamines, arylimides, aryl anhydrides, phenols, arylalkylimides and arylsiloxanes. The list below gives typical examples but does not impose any restriction:

aryls: hexabromobenzene, brominated oligomeric styrene (BOS), pentabromomethylbenzene;

aryl ethers: decabromodiphenyl ether, octabromodiphenyl ether, poly-(2,6-dibromo-1,4-phenylene) ether;

arylalkyl ethers: bis-(2,4,6-tribromophenoxy)-ethane, bis-(pentabromophenoxy)-ethane, poly(tetrabromobisphenol-A glycidyl) ether, poly-(tetrabromohydroquinone-1,2-ethylidene) ether;

arylamines: tris-(2,4-dibromophenyl)-amine, bis(pentabromophenyl)-amine, tribromoaniline;

aryl anhydrides: tetrabromophthalic anhydride;

arylimides: tetrabromophthalimide;

arylalkylimides: ethylene bis-(tetrabromophthalimide);

phenols: tetrabromobisphenol A;

arylsiloxanes: tetrakis-(2,4,6-tribromophenyl)siloxane.

The halogen-containing flameproofing agents are preferably used together with synergistic agents, such as antimony compounds, bismuth compounds and phosphorus compounds. In addition, halogen-free flameproofing agents, in particular organic phosphorus compounds, may be used, also in combination with small amounts of highly fluorinated polymers (PTFE).

The following are preferably used: octabromodiphenyl ether DE 79 ® from Great Lakes, poly(2,6-dibromo-1,4-phenylene (PO 64 P ® from Great Lakes, poly-(tetrabromobisphenol-A glycidyl) ether F 2400 ® from Makhteshim, ethylenebis-(tetrabromophthalimide) Saytex BT 93 ® from Saytech and bis-(2,4,6-tribromophenoxy)-ethane Firemaster FF 680 ® from Great Lakes.

Poly- or oligo-(tetrabromobisphenol A) carbonate BC 52 ® from Great Lakes and poly-(tetrabromobisphenol-A glycidyl) ether F 2400 from Makhteshim are particularly preferred.

Preparation of the molding material

The components A, $B_1$, $B_2$ and, where relevant, C can be mixed by any known method. Preferably, however, the components A, $B_1$, $B_2$ and, where relevant, C are mixed at from 200° to 300° C. by extruding, kneading or rolling the components together, the components having to be isolated beforehand from the solution obtained in the polymerization or from the aqueous dispersion. The graft copolymerization products (components $b_{11}$) obtained in aqueous dispersion can, however, be mixed with the components $b_{12}$ to give $B_1$ or also with $B_2$ to give B, after partial dewatering or directly as the dispersion. Complete drying of the graft copolymer $b_{11}$ is effected during mixing. Thereafter, $B_1$ is mixed with $B_2$ and the polycarbonate, or B with the polycarbonate. However, it is also possible for the partially dewatered component $b_{11}$ or its dispersion to be mixed directly with $b_{12}$, $B_2$, polycarbonate A and the component C, complete drying being effected in this case during the mixing process.

It may be advantageous to premix individual components. It is also possible to mix the components in solution and remove the solvents.

The novel molding materials can be processed by the known methods of thermoplastic processing, for example by extrusion, injection molding, calendering, blow molding, compression molding or sintering; particularly preferably, shaped articles for automotive construction are produced by injection molding from the molding materials prepared by the novel molding process.

The parameters described in the present Patent are determined as follows:

1. The median particle size and the particle size distribution of the elastomer particles prepared in emulsion are determined from the integral mass distribution. The median particle sizes are in all cases the weight average of the particle sizes, as determined by means of an analytical ultracentrifuge according to the method due to W. Scholtan and H. Lange, Kolloid-Z. and Z.-Polymere 250 (1972), 782–796. The ultracentrifuge measurement gives the integral mass distribution of the particle diameter of a sample. From this, it is possible to determine the percentage by weight of particles having a diameter equal to or smaller than a certain size. The median particle diameter, which is also referred to as the $d_{50}$ value of the integral mass distribution, is defined as the particle diameter at which 50% by weight of the particles have a diameter smaller than the diameter corresponding to the $d_{50}$ value. Likewise, 50% by weight of the particles then have a larger diameter than the $d_{50}$ value. To characterize the width of the particle size distribution of the rubber particles, apart from the $d_{50}$ value (median particle diameter) it is also possible to use the $d_{10}$ and $d_{90}$ values which can be obtained from the integral mass distribution. The $d_{10}$ or $d_{90}$ value of the integral mass distribution is defined similarly to the $d_{50}$ value, except that it is based on 10 and 90% by weight, respectively, of the particles.

The median particle size of the elastomer particles of the component $B_2$ prepared in solution was determined by means of electron microscopy (counting).

2. The notched impact strength, $a_K$, in [kJ/m$^2$], of the samples was measured according to DIN 53,453 at 23° C. and −40° C. on standard small bars injection molded at 260° C.

3. (a) The relative solution viscosity $\eta_{rel}$ of the polycarbonate used was measured in a 0.5% strength solution in methylene chloride at 23° C.;
(b) The viscosity number, VN, of the SAN copolymers was measured in 0.5% strength solution in dimethylformamide at 23° C.

4. The total penetration energy, $W_{tot}$, in the Plastechon test (Nm) was determined according to DIN 53,453 on 2 mm thick circular disks injection molded at 270° C. The test was carried out at room temperature (23° C.) and −b 40° C.

5. The gloss was measured on 2 mm thick circular disks (diameter 60 mm) by means of a laboratory reflectometer from Lange, at an angle of incidence of 45°. This type of gloss measurement is a relative measurement. Its unit is stated in scale divisions (SCD), based on a standard supplied by Lange. The conditions chosen for injection molding were a melt (plastic) temperature of 260° C., a mold temperature of 80° C. and an injection time of 0.6 s.

6. The melt flow index MFI was determined according to DIN 53,735 at 260° C. and under a load of 5 kp. (The unit is g/10 min).

7. The Vicat B value was determined according to DIN 53,460.

8. The stability to weathering was tested on 2 mm thick circular disks (60 mm diameter). These were irradiated in a xenon test apparatus 1200 from Heraeus at 45° C., after which the total penetration energy (as under 4) was determined at room temperature. The impact was on the unexposed side. The time stated as a measure of the stability to weathering is the time when the total penetration energy has decreased to 40% of its original value.

The products described below are used for the preparation of novel molding materials and materials for Comparative Experiments.

Component A

A commercial polycarbonate based on bisphenol A and having a relative solution viscosity of 1.30 ml/g was used as component A.

Component B

The graft copolymers described below were used.
$b_{11A}$ A polybutadiene latex was prepared at 25° C. by polymerization of 62 parts of butadiene in the presence of a solution of 0.6 part of tert-dodecyl mercaptan, 0.7 part of Na $C_{14}$-alkylsulfonate as an emulsifier, 0.2 part of potassium peroxodisulfate and 0.2 part of sodium pyrophosphate in 80 parts of water. When the reaction was complete, the polymerization autoclave was let down. The conversion was 98%.

A polybutadiene whose median particle size was 0.1 μm was obtained. The resulting latex was agglomerated by adding 25 parts of an emulsion of a copolymer of 96 parts of ethyl acrylate and 4 parts of methyacrylamide, having a solids content of 10 parts by weight, a polybutadiene latex having a median particle size of 0.35 μm being formed. After the addition of 40 parts of water, 0.4 part of Na $C_{14}$-alkylsulfonate and 0.2 part of potassium peroxodisulfate, 38 parts of a mixture of styrene and acrylonitrile in a ratio of 70:30 were introduced in the course of 4 hours. The polymerization was carried out while stirring the mixture at 75° C. The conversion was virtually quantitative, based on styrene/acrylonitrile. The resulting graft rubber dispersion was precipitated by means of calcium chloride solution, and the graft copolymer isolated was washed with distilled water. $b_{11B}$. An emulsion polymer was prepared as in $b_{11A}$, with the proviso that 65 parts by weight of the S/AN mixture and only 35 parts of the polybutadiene latex were used. $b_{11C}$. An emulsion polymer was prepared as in $b_{11A}$, except that 84 parts of the S/AN mixture and 16 parts of polybutadiene latex were used.

$B_2$ Polybutadiene was dissolved in a mixture of styrene, acrylonitrile and ethylbenzene. The weight ratio of styrene/acrylonitrile was 75:25. The mixture was polymerized with vigorous stirring in a continuous process in three reactors arranged in succession, with an increasing temperature profile. During the polymerization, part of the styrene/acrylonitrile mixture polymerized onto the polybutadiene and formed the graft polymer $b_{21}$, while the remaining part formed the copolymer $b_{22}$. The polymerization product was devolatilized and extruded, and the extrudates were then granulated.

The following analytical data were obtained: 9.3% of polybutadiene, 68% of polystyrene and 22.7% of acrylonitrile. The grafting efficiency was 8.5%.

The median particle diameter determined by counting the particles in the electron micrograph was 1.4 μm.

The product thus contained 17% of the coarse-particled graft rubber $b_{21}$ and 83% of the copolymer $b_{22}$ having a viscosity number of 84 ml/g. An S/AN copolymer (S/AN=75:25) having a viscosity number of 82 and denoted as Y in Table 1 was used as the hard matrix, corresponding to component $b_{12}$ of the claim.

Component C $C_1$ A symmetric three-block copolymer XYX which consisted of 10% by weight of ethylene oxide and 90% by weight of propylene oxide and in which the middle block had a molecular weight of 2,800 was used as the lubricant. Pluriol ® 100).

$C_2$ N,N'-bisstearylethylenediamine (Accra wax) was used as a further lubricant.

The Examples which follow illustrate the invention. In the Examples, parts and percentages are by weight, unless stated otherwise.

EXAMPLES 1 TO 6 AND COMPARATIVE EXPERIMENTS I TO VII

The number of parts by weight stated in Table 1 for components A and B ($b_{11A}$ to $B_2$) were additionally mixed in dry form in each case with 0.75 part of Pluriol ® PE 3100 or 1 part of Accra wax in a fluid mixer and the mixture was extruded at 260° C. in a twin-screw extruder, for example type ZSK from Werner & Pfleiderer. The dry granules of the samples were converted into the moldings for the property tests by injection molding.

Table 2 shows the results for the molding materials. In Comparative Experiments I and VI, two different emulsion graft rubbers (different degrees of grafting) according to European Pat. No. 80,707 were used. The mechanical properties are good but the flow is unsatisfactory.

In some experiments, Pluriol was replaced by Accra wax (cf. for example Comparative Experiment I with VII). This leads to a slight increase in the Vicat temperature and in the MFI. In the novel mixture (cf. Example 5 with Experiment I) the flow increases. Surprisingly, readily flowing mixtures are obtained with Accra wax (Example 6). The mechanical properties are unaffected.

The novel mixtures have good flow and toughness as well as high gloss (in spite of the addition of LABS) and improved stability to weathering.

TABLE 1

| Examples | Components A Parts | Type | Component B $B_1$ Parts | Type | $B_2$ Parts | Parts | Component C Type | Parts | Elastomer content $B_1 + B_2$ based on B | E ratio $B_1/B_2$ |
|---|---|---|---|---|---|---|---|---|---|---|
| 1 | 40 | $b_{11A}$ | 15 | Y | 22.5 | 22.5 | $C_1$ | 0.75 | 18.9 | 82/18 |
| 2 | 30 | " | 17.5 | " | 26.5 | 26 | $C_1$ | 0.75 | 18.9 | 82/18 |
| 3 | 60 | " | 10 | " | 20 | 10 | $C_1$ | 0.75 | 17.8 | 87/13 |
| 4 | 60 | " | 10 | " | 15 | 15 | $C_1$ | 0.75 | 18.9 | 82/18 |
| 5 | 60 | " | 10 | " | 10 | 20 | $C_1$ | 0.75 | 20.2 | 77/23 |
| 6 | 60 | " | 10 | " | 10 | 20 | $C_2$ | 1.0 | 20.2 | 77/23 |
| Comparative Experiments | | | | | | | | | | |
| I* | 60 | $b_{11A}$ | 18 | Y | 22 | — | $C_1$ | 0.75 | 27.9 | |
| II | 60 | $b_{11A}$ | 10 | Y | 30 | — | $C_1$ | 0.75 | 15.5 | |
| III | 60 | — | | | — | 40 | $C_1$ | 0.75 | 9.3 | 0 |
| IV | 40 | — | | | — | 60 | $C_1$ | 0.75 | 9.3 | 0 |
| V | 50 | $b_{11B}$ $b_{11C}$ | 16 10 | Y | 24 | — | $C_1$ | 0.75 | 14.4 | |
| VI* | 70 | $b_{11B}$ | 10 | Y | 15 | — | $C_1$ | 0.75 | 14.3 | |
| VII | 60 | $b_{11A}$ | 18 | Y | 22 | — | $C_2$ | 1.0 | 26.1 | |

*According to EP 80 767

TABLE 2

| Examples | MFI | AK 23° C. | −40° C. | $W_{tot}$ 23° C. | −40° C. | Gloss SCD | Vicat °C. | Stability to weathering/h |
|---|---|---|---|---|---|---|---|---|
| 1 | | 30 | 15 | 42 | 25 | — | | 15 |
| 2 | | 27 | 13 | 35 | 26 | — | | 12.5 |
| 3 | 16 | 48 | 11 | 60 | 58 | 75 | | 14 |
| 4 | 15 | 48 | 17 | 60 | 60 | 73 | | 13 |
| 5 | 14 | 44 | 21 | 58 | 61 | 70 | | 14 |
| 6 | 21 | 41 | — | — | — | | 120.6 | 14.5 |
| Comparative | | | | | | | | |

TABLE 2-continued

| Examples | MFI | AK 23° C. | AK −40° C. | W$_{tot}$ 23° C. | W$_{tot}$ −40° C. | Gloss SCD | Vicat °C. | Stability to weathering/h |
|---|---|---|---|---|---|---|---|---|
| Experiment | | | | | | | | |
| I | 10 | 46 | 19 | 54 | 50 | 73 | 118.5 | 10 |
| II | 17 | 34 | 6 | 60 | 50 | | | 8 |
| III | 30 | 38 | 7 | 52 | 49 | 49 | | 14 |
| IV | 35 | 20 | 4 | 30 | 16 | — | | |
| V | 7 | 38 | 10 | — | — | — | | |
| VI | 10 | 48 | 9 | — | — | — | | 7.5 |
| VII | 12 | 44 | — | — | — | — | 120.1 | |

We claim:

1. A thermoplastic molding material containing, based in each case on the molding material consisting of A+B, A from 30 to 80% by weight of one or more polycarbonates and B from 70 to 20% by weight of a mixture of two different components $B_1$ and $B_2$, each of which consists of one or more graft copolymers $b_{11}$ and $b_{21}$ and each of which consists of one or more copolymers (hard matrix) $b_{12}$ and $b_{22}$, the graft copolymer $b_{11}$ being prepared by emulsion polymerization and the graft copolymer $b_{21}$ being prepared by another method, wherein B contains from 20 to 80% by weight, based on B, of component $B_1$, and component $B_1$ contains from 20 to 60% by weight, based on $B_1$, of graft copolymer $b_{11}$ and from 80 to 40% by weight, based on $B_1$, of copolymer $b_{12}$, the graft copolymer $b_{11}$ being prepared by emulsion polymerization of from 20 to 60 parts by weight of a mixture of one or more vinylaromatic monomers of 8 to 12 carbon atoms or methyl methacrylate or a mixture thereof and of (meth)acrylonitrile or methyl methacrylate in a weight ratio of from 50:50 to 95:5 onto from 80 to 40 parts by weight of a latex of an elastomer (rubber) obtained by emulsion polymerization and having a median particle diameter of from 0.05 to 0.5 μm (d$_{50}$ value of the mass distribution), and copolymer $b_{12}$ containing from 50 to 95% by weight, based on $b_{12}$, of one or more vinylaromatic monomers of 8 to 12 carbon atoms or methyl methacrylate or a mixture thereof and from 50 to 5% by weight of (meth)acrylonitrile or methyl methacrylate as copolymerized units, and furthermore B contains from 80 to 20% by weight, based on B, of component $B_2$ and component $B_2$ contains from 5 to 35% by weight, based on $B_2$, of graft copolymer $b_{21}$ and from 95 to 65% by weight, based on $B_2$, of copolymer $b_{22}$, the graft copolymer $b_{21}$ and the copolymer $b_{22}$ being prepared simultaneously by polymerization of 100 parts by weight of a mixture of one or more vinylaromatic monomers of 8 to 12 carbon atoms or methyl methacrylate or a mixture thereof and (meth)acrylonitrile or methyl methacrylate in a weight ratio of from 50:50 to 95:5 in the presence of from 3 to 33 parts by weight of an elastomer by mass polymerization, in the presence or absence of a solvent, or by mass-suspension polymerization so that the median particle diameter of the particles resulting from the grafting process is from 0.8 to 5 μm, and copolymer $b_{22}$ containing from 50 to 95% by weight, based on $b_{22}$, of one or more vinylaromatic monomers of 8 to 12 carbon atoms or methyl methacrylate or a mixture thereof and from 50 to 5% by weight of (meth)acrylonitrile or methyl methacrylate as copolymerized units, with the proviso that the total elastomer content of $B_1$ and $B_2$ is from 10 to 25% by weight, based on B, and the weight ratio of the elastomer content of $B_1$ and $B_2$ is from 95:5 to 55:45.

2. A thermoplastic molding material as claimed in claim 1, containing, based in each case on the molding material consisting of A+B, A from 40 to 70% by weight of one or more polycarbonates and B from 60 to 30% by weight of a mixture of two different components $B_1$ and $B_2$, each of which consists of one or more graft co-polymers $b_{11}$ and $b_{21}$ and each of which consists of one or more copolymers (hard matrix) $b_{12}$ and $b_{22}$, the graft copolymer $b_{11}$ being prepared by emulsion polymerization and the graft copolymer $b_{21}$ being prepared by another method, wherein B contains from 40 to 80% by weight, based on B, of component $B_1$, and component $B_1$ contains from 25 to 55% by weight, based on $B_1$, of graft copolymer $b_{11}$ and from 75 to 45% by weight, based on $B_1$, of copolymer $b_{12}$, the graft copolymer $b_{11}$ being prepared by emulsion polymerization of from 25 to 50 parts by weight of a mixture of one or more vinylaromatic monomers of 8 to 12 carbon atoms or methyl methacrylate or a mixture thereof and of (meth)acrylonitrile or methyl methacrylate in a weight ratio of from 60:40 to 90:10 onto from 75 to 50 parts by weight of a latex of an elastomer (rubber) obtained by emulsion polymerization and having a median particle diameter of from 0.05 to 0.5 μm (d$_{50}$ value of the mass distribution), and copolymer $b_{12}$ containing from 60 to 90% by weight, based on $b_{12}$, of one or more vinylaromatic monomers of 8 to 12 carbon atoms or methyl methacrylate or a mixture thereof and from 40 to 10% by weight of (meth)acrylonitrile or methyl methacrylate as copolymerized units, and furthermore B contains from 60 to 20% by weight, based on B, of component $B_2$ and component $B_2$ contains from 10 to 30% by weight, based on $B_2$, of graft copolymer $b_{21}$ and from 90 to 70% by weight, based on $B_2$, of copolymer $b_{22}$, the graft copolymer $b_{21}$ and the copolymer $b_{22}$ being prepared simultaneously by polymerization of 100 parts by weight of a mixture of one or more vinylaromatic monomers of 8 to 12 carbon atoms or methyl methacrylate or a mixture thereof and (meth)acrylonitrile or methyl methacrylate in a weight ratio of from 60:40 to 90:10 in the presence of from 4 to 21 parts by weight of an elastomer by mass polymerization, in the presence or absence of a solvent, or by mass-suspension polymerization so that the median particle diameter of the particles resulting from the grafting process is from 0.8 to 5 μm, and copolymer $b_{22}$ containing from 60 to 90% by weight, based on $b_{22}$, of one or more vinylaromatic monomers of 8 to 12 carbon atoms or methyl methacrylate or a mixture thereof and from 40 to 10% by weight of (meth)acrylonitrile or methyl methacrylate as copolymerized units, with the proviso that the total elastomer content of $B_1$ and $B_2$ is from 15 to 21% by weight, based on B, and the weight ratio of the elastomer content of $B_1$ and $B_2$ is from 85:15 to 60:40.

3. A thermoplastic molding material as claimed in claim 1, containing, based in each case on the molding material consisting of A+B, A from 40 to 70% by weight of one or more polycarbonates and B from 60 to 30% by weight of a mixture of two different components $B_1$ and $B_2$, each of which consists of one or more graft copolymers $b_{11}$ and $b_{21}$ and each of which consists of one or more copolymers (hard matrix) $b_{12}$ and $b_{22}$, the graft copolymer $b_{11}$ being prepared by emulsion polymerization and the graft copolymer $b_{21}$ being prepared by another method, wherein B contains from 50 to 75% by weight, based on B, of component $B_1$, and component $B_1$ contains from 25 to 50% by weight, based on $B_1$, of graft copolymer $b_{11}$ and from 75 to 50 by weight, based on $B_1$, of copolymer $b_{12}$, the graft copolymer, $b_{11}$ being prepared by emulsion polymerization of from 30 to 45 parts by weight of a mixture of one or more vinylaromatic monomers of 8 to 12 carbon atoms or methyl methacrylate or a mixture thereof and of (meth)acrylonitrle or methyl methacrylate in a weight ratio of from 65:35 to 80:20 onto from 70 to 55 parts by weight of a latex of an elastomer (rubber) obtained by emulsion polymerization and having a median particle diameter of from 0.05 to 0.5 μm ($d_{50}$ value of the mass distribution), and copolymer $b_{12}$ containing from 65 to 80% by weight, based on $b_{12}$, of one or more vinylaromatic monomers of 8 to 12 carbon atoms or methyl methacrylate or a mixture thereof and from 35 to 20% by weight of (meth)acrylonitrile or methyl methacrylate as copolymerized units, and furthermore B contains from 50 to 25% by weight, based on B, of component $B_2$ and component $B_2$ contains from 15 to 25% by weight, based on $B_2$, of graft copolymer $b_{21}$ and from 85 to 75% by weight, based on $B_2$, of copolymer $b_{22}$, the graft copolymer $b_{21}$ and the copolymer $b_{22}$ being prepared simultaneously by polymerization of 100 parts by weight of a mixture of one or more vinylaromatic monomers of 8 to 12 carbon atoms or methyl methacrylate or a mixture thereof and (meth)acrylonitrile or methyl methacrylate in a weight ratio of from 65:35 to 80:20 in the presence of from 6 to 14 parts by weight of an elastomer by mass polymerization, in the presence or absence of a solvent, or by mass-suspension polymerization so that the median particle diameter of the particles resulting from the grafting process is from 1.0 to 2.0 μm, and copolymer $b_{22}$ containing from 65 to 80% by weight, based on $b_{22}$, of one or more vinylaromatic monomers of 8 to 12 carbon atoms or methyl methacrylate or a mixture thereof and from 35 to 20% by weight of (meth)acrylonitrile or methyl methacrylate as copolymerized units, with the proviso that the total elastomer content of $B_1$ and $B_2$ is from 15 to 21% by weight, based on B, and the weight ratio of the elastomer content of $B_1$ and $B_2$ is from 85:15 to 60:40.

4. A molding material as claimed in claim 3, wherein the graft copolymer $b_{11}$ is prepared by emulsion polymerization of from 30 to 39 parts by weight of a mixture of one or more vinylaratic monomers of 8 to 12 carbon atoms, methyl methacrylate or a mixture thereof and of (meth)acrylonitrile or methyl methacrylate, and the graft copolymer $b_{21}$ is produced in the presence of from 6 to 10 parts by weight of the elastomer, with the proviso that the total elastomer content of $B_1$ and $B_2$ is less than 9.5% by weight, based on the sum of components A and B, and the weight ratio of the graft rubbers $b_{11}$ to $b_{21}$ is greater than 1.5

5. A molding material as claimed in claim 1, wherein the elastomer obtained for the preparation of the graft copolymer $b_{11}$ is based pn polybutadiene, polyalkyl acrylates where alkyl is of 2 to 8 carbon atoms or copolymers of butadiene and the stated acrylates, and the elastomer used for the preparation of the graft copolymer $b_{21}$ is polybutadiene.

6. A molding material as claimed in claim 5, wherein exclusively polybutadiene is used as an elastomer for the preparation of $b_{11}$.

7. A molding material as claimed in claim 3, wherein exclusively styrene and styrene together with acrylonitrile are used as vinylaromatic monomers for the preparation of $b_{11}$, $b_{12}$ and $b_{22}$.

8. A molding material as claimed in claim 1, which contains from 0.1 to 401parts by weight, based on 100 parts by weight of A+B, of conventional additives (component C).

9. A molding material as claimed in claim 8, wherein N,N'-bisstearylethyleneoiamine (Accra wax) is used as an additive, in amounts of from 0.1 to 2.5 parts by weight.

* * * * *